A. C. BECKWITH.
FLANGE OILER NOZZLE.
APPLICATION FILED FEB. 12, 1918.
1,292,567. Patented Jan. 28, 1919.
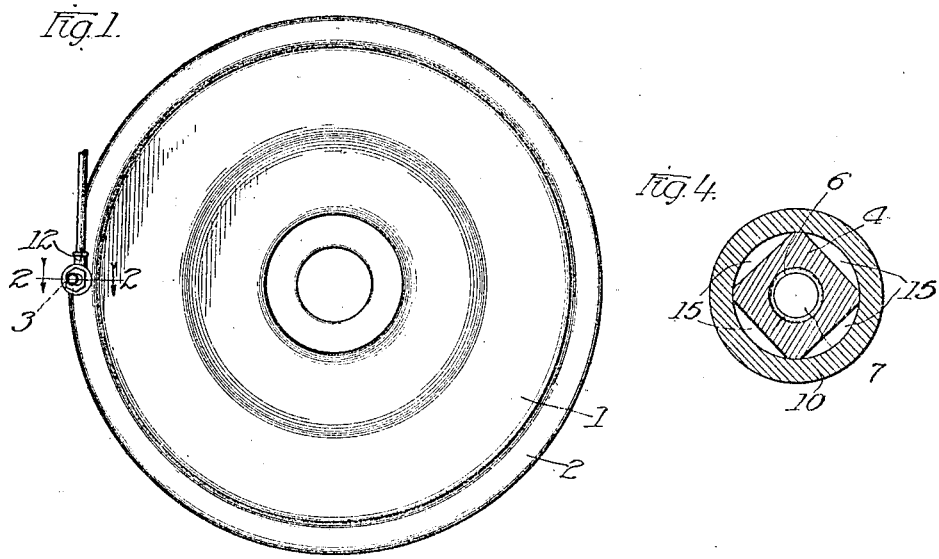
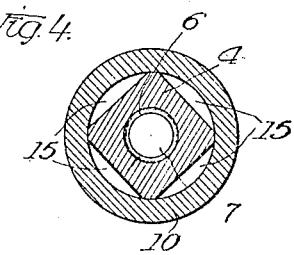
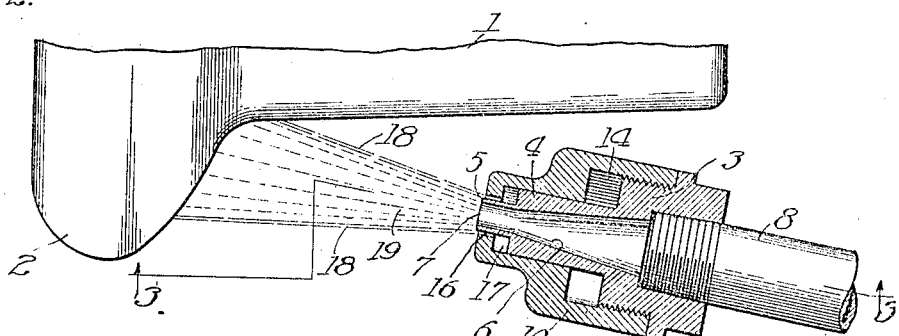
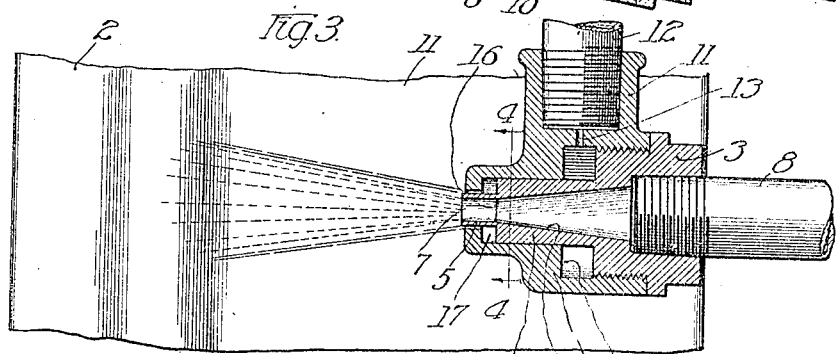
Witnesses:
Robert H. Weir
Arthur W. Carlson
Inventor
Arthur C. Beckwith
By Hice & Hice
Attys.

UNITED STATES PATENT OFFICE.

ARTHUR C. BECKWITH, OF CHICAGO, ILLINOIS.

FLANGE-OILER NOZZLE.

1,292,567.

Specification of Letters Patent.

Patented Jan. 28, 1919.

Application filed February 12, 1918. Serial No. 216,721.

*To all whom it may concern:*

Be it known that I, ARTHUR C. BECKWITH, a citizen of the United States, residing at Chicago, in the county of Cook and State of Illinois, have invented certain new and useful Improvements in Flange-Oiler Nozzles, of which the following is a description.

My invention belongs to that general class of devices known as flange oilers or the like, intended for the oiling or lubricating of car wheel flanges. More especially it relates to an improved flange oiler delivery nozzle adapted to be arranged adjacent the wheel, the lubricant being supplied to and delivered from the nozzle in any particular or desired manner, the delivered jet of lubricant being guarded, shielded or incased in a jet of air or the like. The invention has among its objects the production of a device of the kind described that is simple, convenient, efficient, durable and satisfactory for use wherever found applicable. In a way it is a safety device as it reduces the danger due to the steam in the delivery jet clouding the vision or obscuring or interfering with the seeing of signals or wheels slipping on the rails. Many other objects and advantages of the construction herein shown and described and possible uses thereof will be obvious to those skilled in the art from the disclosures herein given.

To this end my invention consists in the novel arrangement, construction and combination of parts herein shown and described and more particularly pointed out in the claims.

In the drawings, wherein like reference characters indicate like or corresponding parts, Figure 1 is a view in elevation of a wheel illustrating the preferred location of my device;

Fig. 2 is a sectional view taken substantially on line 2—2 of Fig. 1;

Fig. 3 is a sectional view taken substantially on line 3—3 of Fig. 2; and

Fig. 4 is a sectional view taken substantially on line 4—4 of Fig. 3.

Referring to the drawings, 1 represents a wheel or part to be lubricated, the wheel having a suitable tread for contact with the rail and provided with the usual flange 2. Arranged adjacent the wheel, and preferably substantially at the point indicated in Figs. 1, 2 and 3, is a nozzle consisting of the part 3 having an extended part 4, at the extreme end 5 of which is provided an outlet 7 communicating with the interior chamber 6, which communicates with the feed pipe 8. The feed pipe 8 is connected with a source of lubricant supply. I have not considered it necessary to illustrate any particular type of lubricator or system, but ordinarily the lubricant is discharged from the pipe 8 with a suitable amount of steam, so as to discharge the lubricant against the flange 2 of the wheel. Arranged on part 3 is an outer casing or air shield jet nozzle consisting of the part 10 arranged at 11 for connection with the pipe 12, through which compressed air or the equivalent may be discharged into the air nozzle. As most clearly shown in Fig. 3, the part 10 is formed with a chamber 14, 13 being a restricted duct through which the air passes from the pipe 12. In the construction shown, the nozzle part 4 is formed substantially rectangular, or in an equivalent manner, so as to provide the spaces 15 communicating with the air discharge outlet 16. The part 10 is preferably constructed so as to provide a distributing chamber 17 adjacent the outlet 16. The relative sizes of the opening 16 and part 5 may be such as desired, this depending upon the particular requirements as well as the air pressure.

The operation of the device may be briefly described as follows:—The lubricant and steam from the pipe 8 are discharged through the port 7, substantially as indicated by the dotted lines 19. At the same time air under pressure of greater density is discharged through the outlet 16 about the nozzle end 5, so as to provide a shield jet of air substantially as indicated at 18 incasing or surrounding the delivery jet, so that it is prevented from striking on the tread or dropping on the rail, and is directed to the desired point. The oil and steam may be termed the delivery jet and the air the shield jet. I prefer to have the shield jet of compressed air wholly surrounding the delivery jet, although in some cases it might be satisfactory if the delivery jet was only partially surrounded. The compressed air in the shield jet should be of sufficient density to prevent the oil from the delivery jet mixing with it while traversing from the delivery nozzle to the wheel flange, so that it prevents the oil from depositing or dropping upon the wheel tread or upon the rail. It prevents the delivery jet from expanding to any material extent while traversing from the delivery nozzle to the wheel flange, thus insuring greater economy and efficiency in the oil used. The shield jet also permits the use of less steam in the delivery jet, thus reducing the danger due to the steam clouding the vision and obscuring or interfering with the seeing of signals. As a matter of fact, by reason of its permitting less steam to be used it produces a delivery jet nearly if not entirely invisible. By removing the possibility of the wheels slipping because of tread or rail lubrications, it is in this respect also a safety device.

In Fig. 1, I have shown the preferred location of the device, but some times it is necessary to locate the same at other points, for example it might be substantially at the point marked X. If the device is located as shown in Fig. 1 and not provided with a shield jet nozzle, the lubricant will usually fall upon the rail, and if at the point marked X the oil will always fall upon the wheel tread, in either case contributing to the wheel slipping. In either location without my device the oil will scatter from the side of the delivery jet and be wasted, and while the wheel is slowly revolving or standing still oil will be delivered from the side of the delivery jet to the wheel tread, contributing to the wheel slipping. When the wheel is slowly revolving or standing still there is no tendency for the centrifugal action to cause the oil in the tread to flow to the flange, as is the case when the wheel is revolving rapidly. With my device, however, it is immaterial whether the wheel is slowly revolving or standing still, the delivery jet is at all times protected by the shield jet.

As mentioned, my device is applicable for any type of flange oiler, that is flange lubricating device or system delivering liquid lubricant to the wheel flange or rail, nor is it limited to any particular or specific delivery jet nozzle, but the shield jet of compressed air wholly or partially surrounding the delivery jet is applicable to any flange oiler or system using fluid, under steam or other pressure, pressure, force feed or gravity feed.

Having thus described my invention it is obvious that various immaterial modifications may be made in the same without departing from the spirit of my invention, hence I do not wish to be understood as limiting myself to the exact form, construction, arrangement and combination of parts herein shown and described or uses mentioned.

What I claim as new and desire to secure by Letters Patent is:

1. In a device of the kind described and in combination, a nozzle arranged for the discharge of a suitable fluid, and means entirely surrounding said nozzle for discharging a fluid shield jet adjacent said first mentioned fluid whereby the same is circumferentially incased.

2. In a device of the kind described and in combination, a nozzle provided with a lubricant discharge port and arranged with a second port surrounding the first mentioned port, whereby a circumferential shield jet may be discharged about the lubricant discharged from the first mentioned port.

3. A device of the kind described comprising coöperating nozzles, arranged one within the other, the inner nozzle having a delivery jet discharge port and the other a shield jet delivery port arranged adjacent thereto and slightly back of the same, whereby a circumferential shield jet of fluid of greater density than the delivery jet may be discharged and entirely incase the delivery jet.

4. A nozzle of the kind described comprising a body part having an inlet and outlet port, a second part mounted on the first part provided with an inlet and with an outlet port surrounding said first mentioned outlet port, whereby fluid discharged from the first mentioned port is circumferentially surrounded by the discharged fluid from the second mentioned port.

5. A nozzle of the kind described comprising two coöperating parts, one part provided with an inlet for the admission of a lubricant and with a restricted outlet port, the other part mounted on said first mentioned part and provided with an inlet for the admission of compressed air and having a chamber and a restricted duct connecting said chamber and inlet, the second part surrounding the first part adjacent the discharge end thereof but spaced from the first part, whereby a discharge port is formed between the parts adjacent the first mentioned port of the first part, the second part having a distributing chamber adjacent its outlet communicating with the first mentioned chamber in the part.

6. A nozzle of the kind described comprising a chambered part having an inlet for the admission of a lubricant and with a discharge port, said part reduced in size adjacent the outlet, the second part secured about and entirely surrounding said first mentioned part and provided with a compressed air inlet of suitable size and with an outlet port adjacent and surrounding the discharge port end of the first mentioned part at said reduced area, said outlet of said second part communicating with its inlet.

7. In a flange oiler of the kind described and in combination, an oil nozzle and means for discharging a jet of air about the oil discharged from said nozzle, whereby a substantially circumferential shield jet of greater density than the oil jet is produced arranged to direct the flow of oil to a predetermined point.

In testimony whereof, I have hereunto signed my name in the presence of two subscribing witnesses.

ARTHUR C. BECKWITH.

Witnesses:
ROY W. HILL,
CHARLES I. COBB.

Copies of this patent may be obtained for five cents each, by addressing the "Commissioner of Patents, Washington, D. C."